US012103986B2

(12) United States Patent
Chen et al.

(10) Patent No.: US 12,103,986 B2
(45) Date of Patent: Oct. 1, 2024

(54) POLYPROPYLENE AND METHOD FOR PRODUCING THE SAME, AND MELTBLOWN FIBER FABRICS

(71) Applicant: FORMOSA PLASTICS CORPORATION, Kaohsiung (TW)

(72) Inventors: Kwang-Ming Chen, Kaohsiung (TW); Kun-Pei Hsieh, Kaohsiung (TW); Jung-Hung Kao, Kaohsiung (TW); Chao-Shun Chang, Kaohsiung (TW); Hsing-Chun Chen, Kaohsiung (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 0 days.

(21) Appl. No.: 17/504,110

(22) Filed: Oct. 18, 2021

(65) Prior Publication Data

US 2022/0204661 A1 Jun. 30, 2022

(30) Foreign Application Priority Data

Dec. 29, 2020 (TW) ................. 109146740

(51) Int. Cl.
 *C08F 10/06* (2006.01)
 *C08F 4/02* (2006.01)
 *D01D 5/098* (2006.01)

(52) U.S. Cl.
 CPC .............. *C08F 10/06* (2013.01); *C08F 4/022* (2013.01); *D01D 5/0985* (2013.01); *D10B 2321/022* (2013.01)

(58) Field of Classification Search
 CPC .................. C08F 10/06; C08F 4/022
 See application file for complete search history.

(56) References Cited

U.S. PATENT DOCUMENTS

| 10,246,530 B2 | 4/2019 | Hosaka et al. |
| 2017/0362357 A1 | 12/2017 | Leskinen et al. |
| 2020/0031962 A1 | 1/2020 | Kim |
| 2020/0131353 A1* | 4/2020 | Edwards ............. C08L 23/12 |

FOREIGN PATENT DOCUMENTS

| CN | 102159596 A | 8/2011 | |
| CN | 103044583 A | 4/2013 | |
| CN | 103044593 A | 4/2013 | |
| CN | 103201302 A | 7/2013 | |
| CN | 103382234 A | 11/2013 | |
| CN | 103442808 A | 12/2013 | |
| CN | 103665209 A | 3/2014 | |
| CN | 103788258 A | 5/2014 | |
| CN | 103788260 A | 5/2014 | |
| CN | 103788261 A | 5/2014 | |
| CN | 104558819 A | 4/2015 | |
| CN | 104558824 A | 4/2015 | |
| CN | 104558825 A | 4/2015 | |
| CN | 105283503 A | 1/2016 | |
| CN | 105294894 A | 2/2016 | |
| CN | 105622799 A | 6/2016 | |
| CN | 106084488 A | 11/2016 | |
| CN | 106632744 A | 5/2017 | |
| CN | 106632761 A | 5/2017 | |
| CN | 106699933 A | 5/2017 | |
| CN | 106905452 A | 6/2017 | |
| CN | 107075020 A | 8/2017 | |
| CN | 107417813 A | 12/2017 | |
| CN | 107417819 A | 12/2017 | |
| CN | 108250335 A | 7/2018 | |
| CN | 108930072 A | 12/2018 | |
| CN | 109153751 A | 1/2019 | |
| CN | 109422834 A | 3/2019 | |
| CN | 109422958 A | 3/2019 | |
| CN | 109679010 A | 4/2019 | |
| CN | 110483666 A | 11/2019 | |
| CN | 111187481 A | 5/2020 | |
| EP | 1538167 A1 * | 6/2005 | ............. C07F 7/025 |
| EP | 1908767 A1 | 4/2008 | |
| EP | 3647329 A1 * | 5/2020 | ................ C07F 7/28 |
| JP | 2007224097 A | 9/2007 | |
| JP | 2019085478 A | 6/2019 | |
| JP | 2020105358 A | 7/2020 | |
| TW | 200930731 A | 7/2009 | |
| TW | 201425346 A | 7/2014 | |
| TW | 201428007 A | 7/2014 | |
| TW | 201943739 A | 11/2019 | |
| WO | WO2004/029112 A1 | 3/2004 | |
| WO | WO-2012/062737 A1 | 5/2012 | |

* cited by examiner

*Primary Examiner* — Catherine S Branch
(74) *Attorney, Agent, or Firm* — MUNCY, GEISSLER, OLDS & LOWE, PC

(57) ABSTRACT

The present application relates to a polypropylene with high melt flow index and a method for producing the same, and meltblown fiber fabrics. A reacting mixture is firstly provided, and a polymerization process is performed to the reacting mixture in a slurry reaction system to obtain the polypropylene. The reacting mixture includes propylene monomers, Ziegler-Natta catalysts, organoaluminum compounds and electron donor. The polypropylene has high melt flow index and adjustable melting point and molecular weight distribution, such that it is used to produce the meltblown fiber fabrics.

8 Claims, No Drawings

POLYPROPYLENE AND METHOD FOR PRODUCING THE SAME, AND MELTBLOWN FIBER FABRICS

RELATED APPLICATIONS

This application claims priority to Taiwan Application Serial Number 109146740, filed Dec. 29, 2020, which is herein incorporated by reference in its entirety.

BACKGROUND

Field of Invention

The present application relates to a method for producing polypropylene. More particularly, a method for producing polypropylene with high melt flow index is provided.

Description of Related Art

Polypropylene is common polymeric material, and it has excellent thermoplastic properties and mechanical properties, such that the polypropylene is often used to produce various commercial properties. The polypropylene can be further used to produce meltblown fiber fabrics by a meltblown process, so as to be applied as filtering materials. However, a melt flow index of the conventional polypropylene is too low to meet requirements of applications.

Generally, hydrogen gas is introduced during a reaction process for efficiently increasing the melt flow index of the polypropylene, but catalysts are easily deactivated by the hydrogen gas, such that the polypropylene will not be produced with the deactivated catalysts. In another conventional method, products of the polymerization reaction are degraded by peroxides to enhance the melt flow index. However, the residual peroxides in the polypropylene have stronger odors, thereby influencing application fields. Further, the molecular weight distribution of the degraded polypropylene is too narrow to meet requirements of applications.

In view of this, there is an urgent need to provide a polypropylene with high melt flow index and a method for producing the same, and further improving the defects of the conventional polypropylene and the method for producing the same.

SUMMARY

Therefore, an aspect of the present application provides a method for producing polypropylene with high melt flow index. Specific electron donors are applied to solve defects of deactivated catalysts, and a polymerization process is performed in a slurry reaction system, thereby subjecting the polypropylene equipping with excellent properties, therefore meeting requests of application.

Another aspect of the present application provides a polypropylene with high melt flow index. The polypropylene is produced by the aforementioned method.

A further aspect of the present application provides meltblown fiber fabrics. The meltblown fiber fabrics are formed from the aforementioned polypropylene.

According to the aforementioned aspect, a method for producing polypropylene is provided. A reacting mixture is firstly provided, and a polymerization process is performed to the reacting mixture in a slurry reaction system to form the polypropylene. A melt flow index of the polypropylene is higher than or equal to 500 g/10 min, and the reacting mixture comprises propylene monomers, a Ziegler-Natta catalyst, an organoaluminum compound and an electron donor. The Ziegler-Natta catalyst includes phthalate ester compounds, diol ester compounds, diether compounds and/or succinic acid ester compounds. The electron donor includes amino silane compounds. Further, a prepolymerization reaction is firstly performed, and then a polymerization reaction is performed during the polymerization process.

According to some embodiments of the present application, the aforementioned Ziegler-Natta catalyst is obtained by reacting titanium compounds supported with magnesium chloride and phthalate ester compounds, diol ester compounds, diether compounds and/or succinic acid ester compounds.

According to some embodiments of the present application, a molar ratio (Al/Ti) of aluminum atoms in the organoaluminum compounds to titanium atoms in the titanium compounds supported with magnesium chloride is higher than 0 and less than or equal to 1000.

According to some embodiments of the present application, a molar ratio (Si/Ti) of silicon atoms in the amino silane compounds to the titanium atoms in the titanium compounds supported with magnesium chloride is higher than 0 and less than or equal to 50.

According to some embodiments of the present application, the aforementioned amino silane compounds exclude alkoxy groups.

According to some embodiments of the present application, the aforementioned polymerization process is performed in a hydrogen-containing environment.

According to some embodiments of the present application, the aforementioned polymerization reaction is performed at 50° C. to 80° C.

According to some embodiments of the present application, the aforementioned polymerization process is performed in a slurry reaction system.

According to some embodiments of the present application, after the aforementioned prepolymerization reaction is performed, the polymerization process can selectively comprise an operation of adding of a comonomer. Based on an amount of the propylene monomers as 100 wt %, an amount of the comonomer is not larger than 5 wt %.

According to some embodiments of the present application, the aforementioned comonomer includes α-alkene compounds containing 2 to 8 carbons.

According to the further aspect of the present application, a polypropylene is provided. The polypropylene is produced by the aforementioned method. A melt flow index of the polypropylene is higher than or equal to 500 g/10 min.

According to some embodiments of the present application, a melting point of the aforementioned polypropylene is higher than 150° C.

According to some embodiments of the present application, a molecular weight distribution of the aforementioned polypropylene is not less than 3.

According to the further aspect of the present application, meltblown fiber fabrics are provided. The meltblown fiber fabrics are formed by performing a meltblown process to the aforementioned polypropylene. The meltblown fiber fabrics include a plurality of polypropylene fibers, and a fiber diameter of each of the polypropylene fibers is not larger than 4 μm.

In the polypropylene and the method for producing the same, and the meltblown fiber fabrics of the present application, the deactivation defects of the conventional Ziegler-Natta catalyst due to the hydrogen gas are solved by the specific electron donor, thereby increasing the melt flow index of the polypropylene, further enhancing applicability of the polypropylene. Moreover, the polypropylene has a higher isotactic index, such that it has the higher melting point. Furthermore, the molecular weight distribution of the polypropylene is broader. Therefore, the polypropylene has a broader processing window while it is applied in fields.

DETAILED DESCRIPTION

Reference will now be made in detail to the present embodiments of the application, examples of which are illustrated in the accompanying drawings. Wherever possible, the same reference numbers are used in the drawings and the description to refer to the same or like parts.

The polypropylene of the present application is produced by a Ziegler-Natta catalyst system, and a specific electron donor is added during a polymerization process performed to the propylene monomers, thereby solving deactivation defects of the conventional Ziegler-Natta catalyst due to hydrogen gas, such that the polypropylene of the present application has a higher melt flow index, a high isotactic index, and an adjustable melting point and molecular weight distribution. Because the polypropylene has the higher melt flow index, the polypropylene can be used to form polypropylene fibers with a smaller fiber diameter, therefore producing meltblown fiber fabrics.

The polypropylene is produced by performing the polymerization process to a reacting mixture. The reacting mixture comprises propylene monomers, a Ziegler-Natta catalyst, organoaluminum compounds and an electron donor.

The Ziegler-Natta catalyst is obtained by reacting titanium compounds supported with magnesium chloride and phthalate ester compounds, diol ester compounds, diether compounds and/or succinic acid ester compounds. The method for producing the Ziegler-Natta catalyst is known to one skilled in the art and is not illustrated any more here.

The titanium compounds can have structures shown as following formula (I).

$$Ti(R_1)_n(X_1)_{4-n} \quad (I)$$

In the formula (I), $R_1$ independently represents an alkyl group or an alkoxy group of 1 to 4 carbons; $X_1$ independently represents a halogen atom or a hydrogen atom; and n represents an integer of 0 to 4. In some examples, the titanium compounds can include but be not limited to titanium tetrahalide, tetraalkoxy titanium, monoalkyl titanium trihalide, dialkyl titanium dihalide, monohalide trialkyl titanium, trihalide titanium, trialkoxy titanium, dihalogen alkyl titanium, monohalide dialkyl titanium or a combination thereof.

For example, the phthalate ester compounds can include but be not limited to diisobutyl phthalate, di-n-butyl phthalate, di-n-propyl phthalate, diisooctyl phthalate, other suitable phthalate ester compounds or a combination thereof.

After the titanium compounds supported with magnesium chloride has been reacted with the phthalate ester compounds, the Ziegler-Natta catalyst of the present application can be produced.

The organoaluminum compounds of the aforementioned reacting mixture have a structure shown as following formula (II).

$$Al(R_2)_m(X_2)_{3-m} \quad (II)$$

In the formula (II), $R_2$ independently represents an alkyl group or an alkenyl group of 1 to 8 carbons; $X_2$ represents a halogen atom or a hydrogen atom; and m represents an integer of 0 to 3. In some examples, $R_2$ can independently be methyl group, ethyl group, triisobutyl group, n-hexyl group, n-octyl group, ethoxy group, isopentenyl group or other suitable functional groups. For example, the organoaluminum compounds can include but be not limited to triethyl aluminum, tripropyl aluminum, tri-n-butyl aluminum, triisobutyl aluminum, tri-n-octyl aluminum, diethyl aluminum hydrogen, diisobutyl aluminum hydrogen, diethyl aluminum chloride, diisobutyl aluminum chloride, dichloro ethyl aluminum, or a combination thereof.

A molar ratio (Al/Ti) of aluminum atoms in the organoaluminum compounds to titanium atoms in the titanium compounds supported with magnesium chloride is higher than 0 and less than or equal to 1000, and preferably is 30 to 500.

The electron donor of the reacting mixture can include amino silane compounds. In some embodiments, the amino silane compounds exclude alkoxy groups. The Ziegler-Natta catalyst of the present application can have a higher reactivity when the amino silane compounds exclude alkoxy groups, therefore contributing to produce the polypropylene with high melt flow index A molar ratio (Si/Ti) of silicon atoms in the amino silane compounds to the titanium atoms in the titanium compounds supported with magnesium chloride is higher than 0 and less than or equal to 50, and preferably is 0.1 to 20. When the molar ratio (Si/Ti) of the silicon atoms in the amino silane compounds to the titanium atoms in the titanium compounds meets the aforementioned range, it is hard for the Ziegler-Natta catalyst of the present application to be deactivated due to the hydrogen gas.

The polymerization process of the present application is performed with a slurry reaction system, such that small molecular by-products in the produced polypropylene powders can be extracted by a liquid medium of the reaction system, thereby improving qualities (such as odor defects induced by the small molecular by-products) of the polypropylene powders and restraining formation of flying fiber during the end applications. When the polymerization process is performed, propylene gas is firstly dissolved in a reacting solvent, and then the aforementioned Ziegler-Natta catalyst, the organoaluminum compounds and the electron donor are added. Next, 5 mole % to 60 mole % of hydrogen gas (based on the propylene gas as 100 mole %) is introduced, and the prepolymerization reaction is performed at 5° C. to 30° C. Thereafter, the polymerization reaction is performed is performed at 50° C. to 80° C. There are no limitations to the organic reacting solvent. However, the reacting mixture should be dissolve in the solvent, and the polymerization process does not be influenced by the solvent. Preferably, the organic solvent has lower biotoxicity and/or fewer odors to enhance values of the polypropylene fiber. In some examples, the organic reacting solvent can be heptane and/or hexane.

During the polymerization process, the reacting mixture can firstly subjected to the prepolymerization reaction, and then to the polymerization reaction to produce the polypropylene of the present application. In some embodiments, a polymerization time can be 0.5 hours to 4 hours, and a polymerization pressure can be 0.5 kg/cm² to 10 kg/cm². The polymerization process of the present application can be performed in several reacting units (such as reacting tanks). Temperature of each reacting units is 5° C. to 30° C. during the prepolymerization reaction, and temperature of each of those is controlled to 50° C. to 80° C., therefore efficiently adjusting a molecular weight distribution of the polypropylene and improving the influences on the activity of the Ziegler-Natta catalyst induced by the hydrogen gas.

In some embodiments, after the prepolymerization reaction is performed, a comonomer can selectively be added into the reaction system during the polymerization process. The comonomer can include but be not limited to α-alkene compounds containing 2 to 8 carbons, and preferably be α-alkene compounds containing 2 carbons. When the comonomer is added into the reaction system, the comonomer can react with the polypropylene which has been polymerized, thereby lowering crystalline properties of the polypropylene, and further the polypropylene fiber can equip with more flexible mechanical properties. Therefore, defects of harder mechanical properties of conventional polypropylene fiber induced by the Ziegler-Natta catalyst can be solved. It is noted that an isotactic index of the polypropylene would not be lowered though the crystalline properties and the melting point of the polypropylene is decreased due to the addition of the comonomer.

As above description, the comonomer is added during the polymerization reaction. When the polymerization reaction is performed in several reacting units, the comonomer preferably can add into a first reacting unit or a second reacting unit to be further reacted with the prepolymerized polypropylene. More preferably, the comonomer is added into the first reacting unit. It is noted that the comonomer is not limited to be added into the first reacting unit or the second reacting unit during the polymerization reaction, and it can be added into other reacting units during the polymerization reaction, in come embodiments. In other embodiments, the comonomer can be simultaneously added into at least two reacting units.

In some embodiments, based on an amount of the propylene monomers dissolved in the organic solvent as 100 wt %, an amount of the comonomer is not more than (i.e. less than or equal to) 5 wt %. If the amount of the comonomer is more than 5 wt %, excessive comonomer will induce the polypropylene to be viscous, thereby lowering operability thereof. In some examples, based on the polypropylene as 100 wt %, an amount of the comonomer is not more than 2 wt % when the polypropylene has the comonomer.

After the aforementioned polymerization process is performed, the liquid medium of the slurry reaction system is filtered, and the filter cake is subjected to a drying operation to produce the polypropylene powders of the present application. The polypropylene has the melt flow index not less than 500 g/10 min, and polymer chains of the polypropylene have high isotactic index. In some examples, the melt flow index of the polypropylene can be 500 g/10 min, 1500 g/10 min, 2000 g/10 min, 3200 g/10 min, 3500 g/10 min, 4000 g/10 min, higher than 4000 g/10 min, or a value between any two of the above. Furthermore, the polypropylene of the present application has an adjustable melting point and molecular weight distribution. In some examples, the polypropylene of the present application has the melting point higher than 150° C. (such as 150° C. to 165° C.), and the molecular weight distribution of the polypropylene is not less than 3. Therefore, the polypropylene has a broader processing window, thereby equipping with excellent applicability.

In some examples, in the aforementioned method and the polypropylene of the present application, the melting point of the polypropylene can be controlled by selectively adjusting amounts and/or species of the comonomer, and the molecular weight distribution of the polypropylene can be controlled by using several reacting units and/or adjusting reacting parameters (such as reacting time) of each of the reacting units.

The produced polypropylene powders can be used to produce polypropylene products suitable for various applications by general processes and apparatus well known to one skilled in the art.

For example, polypropylene fibers can be produced with the polypropylene of the present application by a general meltblown process. After the meltblown process, a fiber diameter of the polypropylene fibers is not larger than 4 μm (such as 1.5 μm to 4 μm).

Several embodiments are described below to illustrate the application of the present application. However, these embodiments are not used for limiting the present application. For those skilled in the art of the present application, various variations and modifications can be made without departing from the spirit and scope of the present application.

Producing of Polypropylene

Air in the reactor was firstly replaced with nitrogen gas, and heptane was added in the nitrogen gas environment. Next, the nitrogen gas in the reactor was replaced with propylene gas, and the propylene gas is dissolved in the heptane. And then, after the reactor was depressurized to a pressure slightly higher than 1 atm, Ziegler-Natta catalysts, organoaluminum compounds and an electron donor were added under a positive pressure of the propylene gas, and 10 mole % to 60 mole % of hydrogen gas was introduced. The pressure of the reactor could be 0.5 kg/cm$^2$ to 10 kg/cm$^2$.

A prepolymerization reaction was performed at 5° C. to 30° C. After the prepolymerization reaction was completed, the reactor was heated to 50° C. to 80° C. to be subjected to a polymerization reaction. After the polymerization reaction was performed for 0.5 hours to 4 hours, powders were filtered and dried to obtain the polypropylene powders of the present application.

Melting point and molecular weight distribution were measured with methods well known to one skilled in the art and is not illustrated any more here. Furthermore, melt flow index of the polypropylene was measured with a following method. The polypropylene powders were firstly heated at 230° C. for 240 seconds, and then a weight of the melted polypropylene flows through a hole of a die was measured in every 10 minutes with a loading of 2.16 kg. A diameter of the die was 9.5504±0.0076 mm, a height of the die was 8.000±0.025 mm, and a diameter of the hole was 2.095±0.005 mm.

Further, when the aforementioned polymerization process was performed, the polypropylenes were produced with different Ziegler-Natta catalysts and electron donors, and activities of the Ziegler-Natta catalysts and melt flow indexes of the polypropylenes were measured. The results were shown as Table 1. The Ziegler-Natta catalysts (phthalate ester catalysts, diether catalysts, diol ester catalysts, and succinic acid ester catalysts) listed in Table 1 were general catalysts and not illustrated any more here.

TABLE 1

| Ziegler-Natta catalyst | electron donor | activity of the Ziegler-Natta catalyst (g/g-cat.* 2 hr) | melt flow index (g/10 min) |
|---|---|---|---|
| phthalate ester compound | Dicyclopentyl bis(ethylamino) silane | 8778 | 1362 |
| | Diisopropyl dimethoxy silane | 8194 | 605 |
| | Cyclohexyl methyl dimethoxy silane | 7323 | 805 |
| | Isobutyl isopropyl dimethoxy silane | 7721 | 737 |
| | Dicyclopentyl dimethoxy silane | 12306 | 276 |
| diether compound | Dicyclopentyl bis(ethylamino) silane | 7864 | 1534 |
| diol ester compound | | 9278 | 1814 |
| succinic acid ester compound | | 9103 | 517 |
| succinic acid ester compound | | 2104 | 1240 |
| phthalate ester compound | Cyclohexyl methyl dimethoxy silane | 4515 | 1318 |

Accordingly, the specific amino silane compounds are used as the electron donors of the present application, thereby efficiently improving the deactivation defects of the conventional Ziegler-Natta catalyst due to an introduction of the hydrogen gas, such that the melt flow index of the polypropylene can be efficiently enhanced. Furthermore, the polypropylene has a high isotactic index, such that the polypropylene has a higher and adjustable melting point and a broader and adjustable molecular weight distribution, thereby equipping with a broader processing window.

Accordingly, polypropylene fibers can be made from the polypropylene powders of the present application by a meltblown process, and the higher melting point facilitates to enhance physical properties of the polypropylene fibers, thereby improving applicability of the polypropylene fibers.

As is understood by a person skilled in the art, the foregoing preferred embodiments of the present application are illustrated of the present application rather than limiting of the present application. In view of the foregoing, it is intended to cover various modifications and similar arrangements included within the spirit and scope of the appended claims. Therefore, the scope of which should be accorded the broadest interpretation so as to encompass all such modifications and similar structure.

What is claimed is:

1. A method for producing polypropylene, comprising:
    providing a reacting mixture, wherein the reacting mixture comprises propylene monomers, a Ziegler-Natta catalyst, an organoaluminum compound and an electron donor, wherein the Ziegler-Natta catalyst includes phthalate ester compounds, diol ester compounds, diether compounds and/or succinic acid ester compounds, and the electron donor includes amino silane compounds, the amino silane compounds include dicyclopentyl bis(ethylamino)silane, and the amino silane compounds exclude alkoxy groups; and
    performing a polymerization process to the reacting mixture in a slurry reaction system to form the polypropylene, wherein a melt flow index of the polypropylene is 1362 g/10 min to 1814 g/10 min, the polymerization process is performed in a hydrogen-containing environment with 10 mole % to 60 mole % of hydrogen gas based on the propylene monomers as 100 mole %, a polymerization pressure is 0.5 kg/cm$^2$ to 10 kg/cm$^2$, an activity of the Ziegler-Natta catalyst is 4515 to 8778 g/g-cat.*2 hours, and the polymerization process comprises:
    performing a prepolymerization reaction; and
    performing a polymerization reaction.

2. The method for producing the polypropylene of claim 1, wherein the Ziegler-Natta catalyst is obtained by reacting titanium compounds supported with magnesium chloride and phthalate ester compounds, diol ester compounds, diether compounds and/or succinic acid ester compounds.

3. The method for producing the polypropylene of claim 2, wherein a molar ratio (Al/Ti) of aluminum atoms in the organoaluminum compound to titanium atoms in the titanium compounds supported with magnesium chloride is higher than 0 and less than or equal to 1000.

4. The method for producing the polypropylene of claim 2, wherein a molar ratio (Si/Ti) of silicon atoms in the amino silane compounds to titanium atoms in the titanium compounds supported with magnesium chloride is higher than 0 and less than or equal to 50.

5. The method for producing the polypropylene of claim 1, wherein the polymerization reaction is performed at 50° C. to 80° C.

6. The method for producing the polypropylene of claim 1, wherein the polymerization process is performed in a slurry reaction system.

7. The method for producing the polypropylene of claim 1, after the prepolymerization reaction is performed, the polymerization process further comprises:
    adding a comonomer, wherein based on an amount of the propylene monomers as 100 wt %, an amount of the comonomer is not larger than 5 wt %.

8. The method for producing the polypropylene of claim 7, wherein the comonomer includes α-alkene compounds containing 2 to 8 carbons.

* * * * *